Patented Jan. 14, 1936

2,028,118

UNITED STATES PATENT OFFICE 2,028,118

PREPARATION OF THIAZOLE COMPOUNDS

Earl E. Beard, South Milwaukee, and William L. Rintelman, Carrollville, Wis., assignors to E. I. du Pont de Nemours & Company, Wilmington, Del., a corporation of Delaware No Drawing. Application July 25, 1934, Serial No. 736,904

4 Claims. (Cl. 260—44)

This invention relates to an improved process for the preparation of thiazole compounds of the naphthalene, anthraquinone and benzanthrone series.

Numerous processes have been disclosed for preparing thiazole compounds of these series, including those wherein compounds of the formula anthraquinone—N=CCl—aryl are fused with sulfur and wherein anthraquinone-2-azomethines are fused with sulfur in the presence of iodine as a catalyst.

We have found that thiazole derivatives of the naphthalene and the anthraquinone series may be prepared in relatively pure form and in high yields by reacting benzalamino compounds of the naphthalene or anthraquinone series with sulfur in the presence of at least stoichiometrical amounts of bromine, which is present in the reaction in combined form. This bromine may be added in the form of free bromine or as sulfur bromides, such as sulfur mono- or dibromide. In the present process we have found the use of sulfur monobromide to be especially suitable. In this process the amino-naphthalene or aminoanthraquinone compound is first reacted with benzaldehyde or other aromatic aldehyde such as those of the naphthalene or anthraquinone series to form the azomethine compounds. This reaction may be carried out in trichlorobenzene or other inert solvent, and the product so formed may be reacted without isolation with sulfur monobromide to give the corresponding thiazole. By this procedure the thiazole is obtained in a very pure form, and may be readily isolated by filtering directly from the reaction mass.

Our process resides more specifically in reacting compounds of the formula Ar—N=CH—Ar', wherein Ar represents an aryl group of the naphthalene or anthraquinone series and Ar' represents an aryl group of the benzene, naphthalene or anthraquinone series, with sulfur and bromine in an inert high boiling solvent. This process results in materially increased yields over the known processes heretofore used on a commercial scale.

The following examples are given to more fully illustrate our invention, it being understood, however, that our invention is not to be limited to the particular compounds therein disclosed. The parts used are by weight.

Example 1

30 parts of di-benzalamino-anthraquinone (2,6- and 2,7-mixture, about 50:50), 9.3 parts of sulfur, 300 parts of trichlorobenzene and 39 parts of $S_2Br_2$ are mixed and gradually heated to 210–230° C. and held at this temperature for 8–10 hours. The reaction mass is cooled to 155° C. and filtered. The product is first washed with trichlorobenzene, then with alcohol and dried. The resulting diphenyl-dithiazole-anthraquinones dissolve in sulfuric acid, producing a yellow color and dye cotton in yellow shades from a violet to blue colored alkaline hydrosulfite vat.

Example 2

85 parts of dry 2,6-di-benzalamino-anthraquinone (M. P. 262–263.5° C.), made by dissolving the diamine in an excess of benzaldehyde, cooling and filtering off the crystals, are dissolved in 500 parts of trichlorobenzene (B. P. 212–213° C.). 28 parts of sulfur and 98 parts of sulfur monobromide ($S_2Br_2$) are then added. The $S_2Br_2$ is made by dissolving 28 parts of sulfur in 70 parts of bromine. The reaction mass is then heated to 212–213° C. and maintained at this temperature until the reaction is complete, which requires 12–14 hours.

At the beginning of the reaction a thick insoluble product is formed which gradually assumes a crystalline form as the heating continues. When the reaction is complete, the hot mass is filtered and washed with trichlorobenzene and dried. The C-diphenyl-2,1(S)-6,5(S)-anthraquinone-dithiazole remains as a yellow crystalline compound in a high state of purity.

Example 3

50 parts of 2,6-diamino-anthraquinone are suspended in 550 parts of trichlorobenzene to which are added 50 parts of benzaldehyde. The suspension is heated to 200° C. and held at this temperature until the diamine passes into solution and the evolution of water ceases. It is then cooled to 50° C. The 2,6-di-benzalamino-anthraquinone crystallizes out in large needles. 50 parts of sulfur and 102.9 parts of sulfur monobromide are then added and the whole is heated to 212–213° C. at which temperature the reaction is maintained until completion. The C-diphenyl-2,1-(S)-6,5(S)-anthraquinone-dithiazole is isolated according to the method described in Example 2.

Example 4

72.3 parts of 2,6-di(o-chloro-benzalamino)-anthraquinone, M. P. 270.5–272.0° C. (prepared by treating 2,6-diamino-anthraquinone in boiling dichlorobenzene with an excess of o-chlorobenzaldehyde until the evolution of water ceases and the diamine dissolves), is suspended in 450 parts of trichlorobenzene (B. P. 212–213° C). 73.7 parts of sulfur monobromide and 20 parts of sulfur are then added and the reaction mass is heated at the boiling point until the reaction is complete (12–24 hours). The yellow, crystalline dichloro-dithiazole compound isolated as in Example 2, dyes cotton from a violet vat in fast green-yellow shades of excellent fastness.

*Example 5*

50 parts of 2-benzalamino-anthraquinone, 11.5 parts of sulfur and 44 parts of sulfur monobromide ($S_2Br_2$) are heated in 300 parts of trichlorobenzene at 215° C. during 7–8 hours. The reaction mass is then cooled to 25° C. and filtered. The phenyl-2,1-anthraquinone-thiazole is washed with trichlorobenzene, then with alcohol and dried. The thiazole so prepared dissolves in sulfuric acid with a yellow color and in an alkaline hydrosulfite vat with a blue-red color.

*Example 6*

94 parts of 2-benzalamino-naphthalene (prepared by heating together beta-naphthylamine and benzaldehyde), 27 parts of sulfur, 112 parts of sulfur monobromide ($S_2Br_2$) and 600–800 parts of trichlorobenzene are mixed together and slowly heated to boiling and held at that temperature for 8–10 hours. The reaction mass is cooled and filtered to free from suspended sulfur. The filtrate, after steam distillation, yields a product which crystallizes from alcohol in white crystals of M. P. 102–104° and corresponding in nitrogen and sulfur analysis to that required by the known compound C-phenyl-2,1-naphthalene-thiazole.

Likewise, substituted amino-anthraquinones such as 1-chloro-2-amino-anthraquinone, 2-amino-3-chloro-anthraquinone and other compounds of the benzanthrone series such as Bz1-amino-benzanthrone, 6-amino-benzanthrone and their chloro substitution products may be converted to the corresponding banzalamino compounds and reacted with sulfur and bromine to give the corresponding thiazoles.

In place of the benzaldehyde, other aldehydes of the naphthalene and anthraquinone series may be used to form the azomethines in the manner illustrated in U. S. Patent 1,881,697, and these compounds may then be converted to the corresponding thiazoles by reacting them with sulfur monobromide. While the reaction may be carried out with stoichiometrical amounts of sulfur and bromine or sulfur monobromide ($S_2Br_2$), the use of sulfur in excess of that illustrated by the formula $S_2Br_2$ is preferred, as more fully illustrated in the examples above given.

The temperature, time of reaction and concentration of the mass are not critical in this reaction, and the conditions specifically given in the examples may be varied by those skilled in the art within relatively wide limits. However, the preferred temperatures for completing the thiazolization reaction are between 180 and 250° C. The higher brominated benzenes and chloronaphthalenes and other inert high boiling solvents which do not undergo bromination under the conditions employed may be used as solvents for this reaction.

We claim:

1. In the process for producing thiazole compounds wherein compounds having the atomic grouping Ar—N=CH—Ar', in which Ar represents an aryl radical of the naphthalene and anthraquinone series, and Ar' represents an aryl radical of the benzene, naphthalene and anthraquinone series, are fused with sulfur, the step which comprises carrying out the reaction in the presence of at least stoichiometrical amounts of bromine.

2. In the process for producing thiazole compounds wherein compounds having the atomic grouping Aq—N=CH—$C_6H_5$, in which Aq represents a radical of the anthraquinone series, are fused with sulfur, the step which comprises carrying out the reaction in the presence of at least stoichiometrical amounts of bromine.

3. In the process for producing C-diaryl-2,1(S)-6,5-(S)-anthraquinone-dithiazoles, the steps which comprise reacting 2,6-diamino-anthraquinone with benzaldehyde in an inert solvent by heating to reaction temperatures, adding at least stoichiometrical amounts of sulfur and bromine in the free state or as sulfur bromide to the reaction mass and heating the mixture to 180 to 250° C., and isolating the resulting product.

4. In the process for preparing C-diaryl-2,1(S)-6,5(S)-anthraquinone-dithiazoles in which 2,6-di-benzalamino-anthraquinone is fused with sulfur, the step which comprises carrying out the reaction in the presence of stoichiometrical amounts of bromine.

EARL E. BEARD.
WILLIAM L. RINTELMAN.